United States Patent

Low et al.

[15] 3,664,185

[45] May 23, 1972

[54] ROTARY ACTUATOR

[72] Inventors: George M. Low, Deputy Administrator of the National Aeronautics and Space Administration with respect to an invention of; Charles Kallins, 72 Orange Drive, Jericho, N.Y. 11753; Jerome Ostroff, 20 Ambrose Lane, Northport, N.Y. 11768

[22] Filed: June 4, 1970

[21] Appl. No.: 43,327

[52] U.S. Cl. ................................................73/136 R, 308/2 A
[51] Int. Cl. ..........................................................G01l 5/00
[58] Field of Search ..............73/99, 136, 133; 33/1 PT, 1 N; 308/2 A; 267/154, 160; 318/159, 160, 436, 690

[56] References Cited

UNITED STATES PATENTS

| | | | |
|---|---|---|---|
| 3,127,766 | 4/1964 | Wolle | ......................................73/141 |
| 2,735,731 | 2/1956 | Freebairn, Jr. et al. | ................308/2 A |
| 2,907,563 | 10/1959 | Verde et al. | .........................308/2 A X |

*Primary Examiner*—Charles A. Ruehl
*Attorney*—John R. Manning, J. H. Warden and Monte F. Mott

[57] ABSTRACT

A rotary actuator particularly suited for use in environments wherein rolling and sliding friction preferably is to be avoided, such as in a high-vacuum celestial space environment, characterized by the utilization of a plurality of spaced tri-flex pivots each having a linear torque-angle characteristic over its operative range adapted continuously to support the shaft in concentric alignment within a tubular housing and an electrically energizable torquer having linear torque-current characteristics over its operating range magnetically coupled with the shaft for imposing rotation thereto for rotating the shaft against the bias of the tri-flex pivots, and an ammeter electrically coupled with said torquer for providing an output indicative of the current being supplied to the torquer and hence the angular position of the shaft.

1 Claim, 5 Drawing Figures

PATENTED MAY 23 1972　　　　　　　　　　　　　　　3,664,185
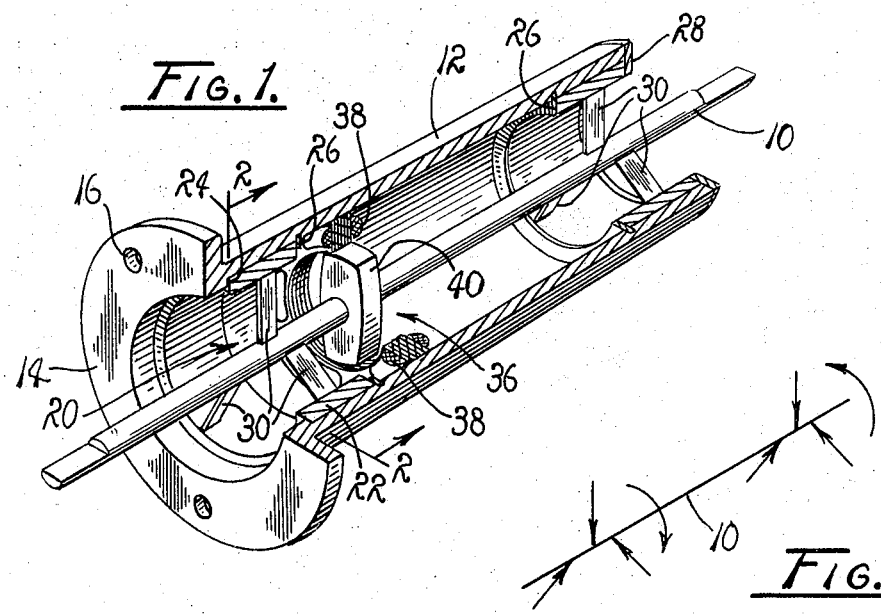
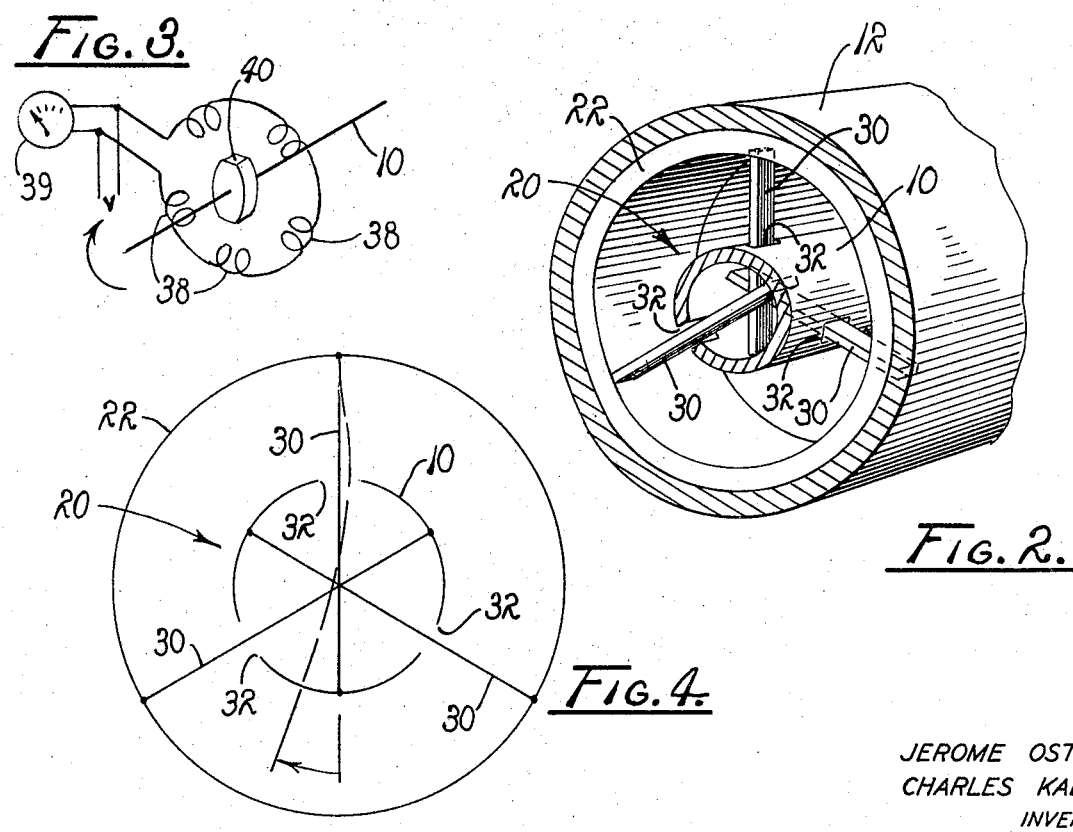
JEROME OSTROFF
CHARLES KALLINS
INVENTORS
ATTORNEYS

ROTARY ACTUATOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention relates to actuators employed in driving mechanical linkages, and more particularly to a rotary actuator suitable for use in a celestial space environment.

2. Description of the Prior Art

The prior art includes numerous actuators for imparting rotary motion to operatively connected mechanical linkages. Normally, such devices include an output shaft operatively supported by bearing surfaces of various designs. Where the actuator is employed in driving mechanical linkages for extended periods of time in a high-vacuum environment, rolling contacts with bearings, or plain bearing surfaces, introduce likelihood of cold welding and lubrication breakdown. To overcome such difficulties, it has been the practice to provide various types of seals, including dynamic or rotational vacuum seals, for sealing the various bearing surfaces against the high-vacuum environment. The complexity of such structure is readily apparent. Furthermore, undesired radial displacement of the output shaft commonly is experienced when the shaft is supported in bearing surfaces and torque is applied thereto.

It has been common practice to employ a potentiometer for detecting the extent of rotation imparted to a torqued shaft. However, it is important to note that in a high-vacuum environment, the wiper, as is normally provided in a potentiometer, tends to experience cold welding. Hence, use of such devices in space has not proven totally satisfactory.

OBJECTS AND SUMMARY OF THE INVENTION

This invention overcomes many of the aforementioned difficulties through the use of a plurality of tri-flex pivots for supporting an elongated output shaft in concentric alignment within a tubular housing for an electrically energizable actuator so that a rotating load may be imposed upon the output shaft for positioning the shaft to a selected angular position without imparting radial displacement to the shaft or developing undesired forces of friction along the surface thereof, while the position of the shaft is monitored through an electrical current detector.

Accordingly, an object of the instant invention is to provide an improved rotary actuator.

Another object is to provide an improved rotary actuator having an output shaft operatively supported for rotation by a plurality of flexures, whereby a frictional engagement between mated surfaces is precluded.

Another object is to provide an improved actuator employing tri-flex pivots adapted to provide an output imposed by an electrically energizable torquer while maintaining concentricity between the actuator housing and the output shaft.

Another object is to provide an actuator for use in a high-vacuum environment which is advanced in a first direction under the influence of an electrically energizable torquer for actuating mechanical linkages and returned to an initial position under the influence of spring recovery forces applied by a plurality of deformed flexures.

Another object is to provide a rotatable actuator having an output shaft extended concentrically through a tubular housing and supported by a plurality of radially extended flexures spaced 120° apart, an electrically energizable torquer, for rotating the shaft to a selected angular position and a current detector for detecting current flow through the torquer and providing an output signal indicative of the angular position, whereby the actuator can be employed for selectively displacing a linkage in a high-vacuum environment without encountering shaft eccentricity, cold welding and lubrication breakdown.

These together with other objects and advantages of the present invention will subsequently become more clearly apparent upon reference to the following description in the specification and accompanying drawing.

BRIEF DESCRIPTION OF THE DRAWING

FIG. 1 is a partially sectioned perspective view of the actuator embodying the principles of the present invention.

FIG. 2 is a cross section taken generally on line 2—2 of FIG. 1, illustrating the coupling of flexures.

FIG. 3 is a schematic diagram of the actuator illustrated in FIG. 1.

FIG. 4 is a diagrammatic view illustrating the deflection characteristics of the flexures employed in the actuator of FIG. 1.

FIG. 5 is a force diagram illustrating an application of forces to the actuator output shaft by the flexures associated therewith.

DESCRIPTION OF THE PREFERRED EMBODIMENT

An actuator embodying the principles of the present invention is best shown in FIG. 1. The actuator is provided with an elongated output shaft 10 which is to be employed in imparting a rate of oscillatory rotation to selected mechanical linkages, not shown. As various means may be employed in coupling the shaft 10 with the selected mechanical linkages, a detailed description thereof is omitted. However, it is to be understood that the shaft is coupled with given linkages through any convenient coupling, including socket and pinned couplings, for example.

The shaft 10 is extended through a housing 12 of a tubular configuration and is mounted in a concentric relationship therewith. The housing 12 is provided with a convenient mounting flange 14 circumscribing one end thereof and including a plurality of openings 16 for receiving mounting screws, not shown, which serve to support the housing 12 in a suitable disposition relative to the wall of a space craft, or to couple the housing with other convenient mounting surfaces.

Mounted within the housing 12, at the opposite ends thereof, there is a pair of tri-flex pivots 20. These supports operatively serve to support the shaft 10 in a concentric disposition relative to the internal surfaces of the housing. Each of the tri-flex pivots 20 is a mirror image of the other, and includes an annular support ring 22 having an outside diameter such that the ring is adapted to be seated within the opposite ends of the housing 12.

The support rings 22 are retained in place within the housing 12 by any convenient means. For example, one of the rings is retained at the flanged end of the housing by a shoulder 24 and a retainer insert 26 seated in an appropriately formed annular groove. At the opposite end of a housing there is a lock ring 28 welded to the housing to provide a convenient shoulder for retaining the support ring 22 against axial displacement from the housing while an insert 26 is seated in the housing in a manner similar to that in which the insert 26 is seated for retaining the support ring at the flanged end of the housing.

The support ring 22 serves to support the shaft 10 through three flexures 30. The flexures extend radially from the internal surface of the support ring through openings 32 into engagement with an internal surface of the shaft 10. In order that the shaft may be rotated while an optimum radial support is provided through the use of the flexures, the members are displaced 120° apart, while being axially displaced along the shaft 10, whereby regardless of the orientation of the housing 12 substantial concentricity is maintained between the shaft and the housing.

Maximum radial rigidity is obtained when the individual flexures 30 are undeflected as is found in the normally relaxed or null orientation for the pivot. However, in order to avoid non-linearities that may exist at or near the relaxed position, the pivots can torsionally be pre-loaded so that the flexures are deflected while at a null orientation.

Each flexure 30 assumes the form of a leaf spring and is so fabricated as to generate a given force when deflected through a predetermined angle. Preferably, each has a linear torque-angle characteristic over its operating range, however, it should be apparent that flex pivots can be employed where they have a non-linear torque-angle characteristic, so long as the position for the shaft is a determinable value in the presence of a given torque. While the shaft 10 is retained against radial displacement by the flexures as torque is applied thereto, radially applied forces tend to impart skew to the shaft 10 since the leaf springs do not intersect. Consequently, in order to prevent skewing of the shaft, the tri-flex pivots mounted within the housing 12 are so oriented that the radial force components of each pivot are mirror images of the other, whereby the sum of the moments acting on the shaft 10 is equal to zero.

Each of the flexures 30 is welded or otherwise secured to the internal surface of the support ring 22 as it extends through an opening 32 formed in the surface of the shaft 10. Each of the flexures extend through the longitudinal axis of the shaft and is fixedly secured to its internal surface. Therefore, as a torque is applied to the shaft each of the flexures is deflected to accommodate a rate of rotation for the shaft, in a manner illustrated in FIG. 4, and this deflection of the flexures serves to develop flexure recovery forces which are applied to the shaft for reorienting the shaft to its null position once the torque is removed.

Preferably, the material employed in fabricating the flexures 30 should have a high strength and a constant modulus of elasticity over the useful stress and temperature range, as well as being compatible for welding purposes. Chemical milling conveniently is employed in fabricating the flexures to the proper dimension for achieving the desired spring rates. Ideally, for a null condition, the flexures are relaxed and extend in a straight line from a point on the inner surface of the support ring 22 to a point on the inner surface of the shaft 10. If the flexures are too short, or too long, an unstable null condition is imposed on the shaft, due to a resulting "toggling" effect. Therefore, it is important that the flexures be of equal and appropriate lengths.

For achieving the desired rotation of the shaft 10, there is provided a conveniently arranged torquing motor 36. This motor includes an electrically energizable stator coil 38, FIG. 3, and a suitable rotor 40, illustrated as a permanent bar magnet. Of course, it is possible to employ an electrically energizable rotor to minimize moving inertia. In practice, the coil 38 is connected with a convenient voltage source, designated V, FIG. 3. The electrical current is measured by a suitable device such as an ammeter 39, and establishes a magnetic field about the coil of a density proportional to its flow. The rotor and stator of the torquer magnetically are coupled in a manner such that the torquer has a linear torque-current characteristic.

It is to be understood that as the shaft 10 is driven in rotation against the applied forces of the flexures 30, under the influence of the magnetic field established in a coil 38, the angular position of the shaft or the extent of the imparted rotation continuously is indicated through the current measuring device 39. Shaft recovery or return rotation is achieved in response to the torsional spring rates of the flexures 30.

OPERATION

It is believed that in view of the foregoing description, the operation of the device will be readily understood and it will be briefly reviewed at this point. With the shaft 10 supported by a pair of axially spaced tri-flex pivots 20, the individual flexures 30 of which are extended radially from support rings through the axis of rotation of the shaft 10, the shaft is radially stabilized in a concentric disposition relative to the internal surfaces of the housing 12. However, as an electrical signal is applied to the coil 38 of the torquing motor 36, rotation is imparted to the shaft 10 whereupon the individual flexures 30 are deflected and an actuator output is provided. This output is directly proportional to the current applied to the coil 38. By combining the opposing effects of the linear torque-current characteristics of the torquing motor 36 with the linear torque-angle characteristics of the tri-flex pivots 20, a known angular displacement is imposed on the shaft 10, through application to the coil 38 of an electrical current of a given amperage. The angular displacement of the shaft is indicated through an output signal derived from the current measuring device 39. This signal may be delivered to the ground station through any convenient circuitry.

Once the desired displacement is imparted to the shaft 10 for achieving a selected actuation of operatively associated mechanical linkages, the applied voltage is removed from the coil 38 so that the flexures 30 are permitted to recover and thus impart a rate of rotation to the shaft for returning it to its null position.

Due to the lack of rolling or sliding engagement of the shaft with its supports, and the lack of sliding engagement of the components of a potentiometer, cold welding and lubrication breakdown, as may be experienced in a high-vacuum environment, are readily obviated while a high degree of concentricity operatively is maintained for the shaft relative to the housing of the actuator. Furthermore, since rolling and sliding friction are avoided, sealing of the actuator is simplified.

Although the invention has been herein shown and described in what is conceived to be the most practical and preferred embodiment, it is recognized that departures may be made therefrom within the scope of the invention.

What is claimed is:

1. In an actuator of a type including a tubular housing, a rotatable tubular output shaft concentrically extended through said housing, a magnetically polarized rotor supported by and fixed to said output shaft, and means including a source of electrical potential and an electrically energizable stator coil coupled with said source of electrical potential and circumscribing said rotor for establishing about said rotor a magnetic field of a density proportional to the magnitude of a flow of electrical current established therethrough, whereby said output shaft is angularly displaced in response to the flow of electrical current through said coil, the improvement comprising:

A. a pair of axially spaced tri-flex pivots coupled in supporting relationship with said output shaft, each of said tri-flex pivots including three elongated flexures disposed in angularly related planes and fixed to said output shaft, each of said flexures being extended radially through the longitudinal axis of symmetry of said output shaft and having one end thereof secured to the internal surface of said tubular housing, whereby the output shaft is angularly displaced in response to a flow of electrical current established through said coil, through an angle of a magnitude directly proportional to the magnitude of the flow of electrical current; and B. means for continuously measuring the magnitude of the flow of electrical current through said coil, whereby the magnitude of the angle through which the output shaft is displaced continuously is monitored.

* * * * *